United States Patent
Li et al.

(10) Patent No.: US 11,541,867 B2
(45) Date of Patent: Jan. 3, 2023

(54) METHOD AND DEVICE FOR CONTROLLING MOTION OF VEHICLE, AND VEHICLE

(71) Applicant: Tsinghua University, Beijing (CN)

(72) Inventors: Shengbo Li, Beijing (CN); Bo Cheng, Beijing (CN); Keqiang Li, Beijing (CN); Hongbo Gao, Beijing (CN); Qingfeng Lin, Beijing (CN); Xuedong Liu, Beijing (CN); Zhitao Wang, Beijing (CN); Ziyu Lin, Beijing (CN); Jianqiang Wang, Beijing (CN); Yugong Luo, Beijing (CN); Diange Yang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 609 days.

(21) Appl. No.: 16/508,953

(22) Filed: Jul. 11, 2019

(65) Prior Publication Data
US 2019/0329757 A1  Oct. 31, 2019

Related U.S. Application Data

(63) Continuation of application No. PCT/CN2017/114766, filed on Dec. 6, 2017.

(30) Foreign Application Priority Data

Jul. 27, 2017  (CN) .......................... 20171062189.8

(51) Int. Cl.
*B60W 20/12* (2016.01)
*B60W 10/06* (2006.01)
(Continued)

(52) U.S. Cl.
CPC ............ *B60W 20/12* (2016.01); *B60W 10/06* (2013.01); *B60W 10/08* (2013.01);
(Continued)

(58) Field of Classification Search
CPC ...... B60W 20/12; B60W 10/06; B60W 10/08; B60W 30/143; B60W 2520/10;
(Continued)

(56) References Cited

U.S. PATENT DOCUMENTS

| 2014/0229043 A1* | 8/2014 | Frank | B60W 20/20 701/22 |
| 2016/0221576 A1* | 8/2016 | Wang | B60W 30/14 |
| 2017/0001639 A1* | 1/2017 | Dempsey | B60W 50/0097 |

FOREIGN PATENT DOCUMENTS

CN  107433942  12/2017

OTHER PUBLICATIONS

WIPO, ISR for PCT/CN2017/114766, dated Apr. 20, 2018.

* cited by examiner

*Primary Examiner* — Geepy Pe
*Assistant Examiner* — Paulo Roberto Gonzalez Leite
(74) *Attorney, Agent, or Firm* — Hodgson Russ LLP

(57) ABSTRACT

A power system of a vehicle includes an engine, a first motor and a second motor. A method for controlling motion of the vehicle includes: receiving a cruise speed, a speed fluctuation quantity and a preset traveling mileage of the vehicle, and obtaining an upper speed bound and a lower speed bound of the vehicle based on the cruise speed and the speed fluctuation quantity; adjusting a current speed of the vehicle to the lower speed bound, and controlling the vehicle to enter a first cruise phase of a two-phase cruise mode; and controlling the vehicle to enter a second cruise phase of the two-phase cruise mode when the current speed of the vehicle is greater than or equal to the upper speed bound and a (Continued)

current traveling mileage is less than the preset traveling mileage.

12 Claims, 5 Drawing Sheets

(51) Int. Cl.
*B60W 10/08* (2006.01)
*B60W 30/14* (2006.01)

(52) U.S. Cl.
CPC ....... *B60W 30/143* (2013.01); *B60W 2520/10* (2013.01); *B60W 2710/0644* (2013.01); *B60W 2710/0666* (2013.01); *B60W 2710/081* (2013.01); *B60W 2710/083* (2013.01); *B60W 2720/106* (2013.01); *B60Y 2300/143* (2013.01); *B60Y 2300/43* (2013.01); *B60Y 2300/60* (2013.01)

(58) Field of Classification Search
CPC . B60W 2710/0644; B60W 2710/0666; B60W 2710/081; B60W 2710/083; B60W 2720/106; B60W 2720/103; B60W 2720/10; B60W 20/40; B60W 30/14; B60Y 2300/143; B60Y 2300/43; B60Y 2300/60; B60K 6/445; Y02T 10/62
See application file for complete search history.

METHOD AND DEVICE FOR CONTROLLING MOTION OF VEHICLE, AND VEHICLE

CROSS-REFERENCE TO RELATED APPLICATIONS

This application is a continuation of International Application No. PCT/CN2017/114766, filed Dec. 6, 2017, which claims priority to Chinese Patent Application No. 201710621898.8, filed Jul. 27, 2017. The entire disclosures of the aforementioned applications are incorporated herein by reference.

TECHNICAL FIELD

The present disclosure relates to the field of vehicle technologies, and more particularly, to a method and a device for controlling a motion of a vehicle, and a vehicle.

BACKGROUND

Electric vehicles are vehicles with the greatest energy saving potential, their research on periodic cruise control strategies are still in the blank. As a typical multidisciplinary crossover system, electric vehicles are deeply integrated with electrical, mechanical, chemical and thermodynamic systems, while the energy efficiency of the system is improved, the management and coordination of the system is more complicated due to the existence of multiple power sources, and the energy and power management strategies of the system directly affect the system performance, which needs to be solved urgently.

SUMMARY

The present disclosure provides a method and a device for controlling a motion of a vehicle, and a vehicle.

Embodiments of the present disclosure provide a method for controlling a motion of a vehicle. A power system of the vehicle includes an engine, a first motor, and a second motor. The method includes: receiving a cruise speed, a speed fluctuation quantity and a preset traveling mileage of the vehicle, and obtaining an upper speed bound and a lower speed bound of the vehicle based on the cruise speed and the speed fluctuation quantity; adjusting a current speed of the vehicle to the lower speed bound, and controlling the vehicle to enter a first cruise phase of a two-phase cruise mode, in which in the first cruise phase, the engine and the first motor are started, and the second motor is closed; and controlling the vehicle to enter a second cruise phase of the two-phase cruise mode when the current speed of the vehicle is greater than or equal to the upper speed bound and a current traveling mileage is less than the preset traveling mileage, in which in the second cruise phase, the first motor and the second motor are started, and the engine is closed.

Embodiments of the present disclosure further provide a device for controlling a motion of a vehicle. A power system of the vehicle includes an engine, a first motor, and a second motor. The device includes a processor and a memory configured to store instructions executable by the processor. The processor is configured to run a computer program corresponding to the instructions by calling the instructions stored in the memory, so as to: receive a cruise speed, a speed fluctuation quantity and a preset traveling mileage of the vehicle, and obtain an upper speed bound and a lower speed bound of the vehicle based on the cruise speed and the speed fluctuation quantity; adjust a current speed of the vehicle to the lower speed bound, and control the vehicle to enter a first cruise phase of a two-phase cruise mode, in which in the first cruise phase, the engine and the first motor are started, and the second motor is closed; and control the vehicle to enter a second cruise phase of the two-phase cruise mode when the current speed of the vehicle is greater than or equal to the upper speed bound and a current traveling mileage is less than the preset traveling mileage, in which in the second cruise phase, the first motor and the second motor are started, and the engine is closed.

Embodiments of the present disclosure further provide a vehicle. The vehicle includes a power system including an engine, a first motor and a second motor, and a controller. The controller is configured to: receive a cruise speed, a speed fluctuation quantity and a preset traveling mileage of the vehicle, and obtain an upper speed bound and a lower speed bound of the vehicle based on the cruise speed and the speed fluctuation quantity; adjust a current speed of the vehicle to the lower speed bound, and control the vehicle to enter a first cruise phase of a two-phase cruise mode, in which in the first cruise phase, the engine and the first motor are started, and the second motor is closed; and control the vehicle to enter a second cruise phase of the two-phase cruise mode when the current speed of the vehicle is greater than or equal to the upper speed bound and a current traveling mileage is less than the preset traveling mileage, in which in the second cruise phase, the first motor and the second motor are started, and the engine is closed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
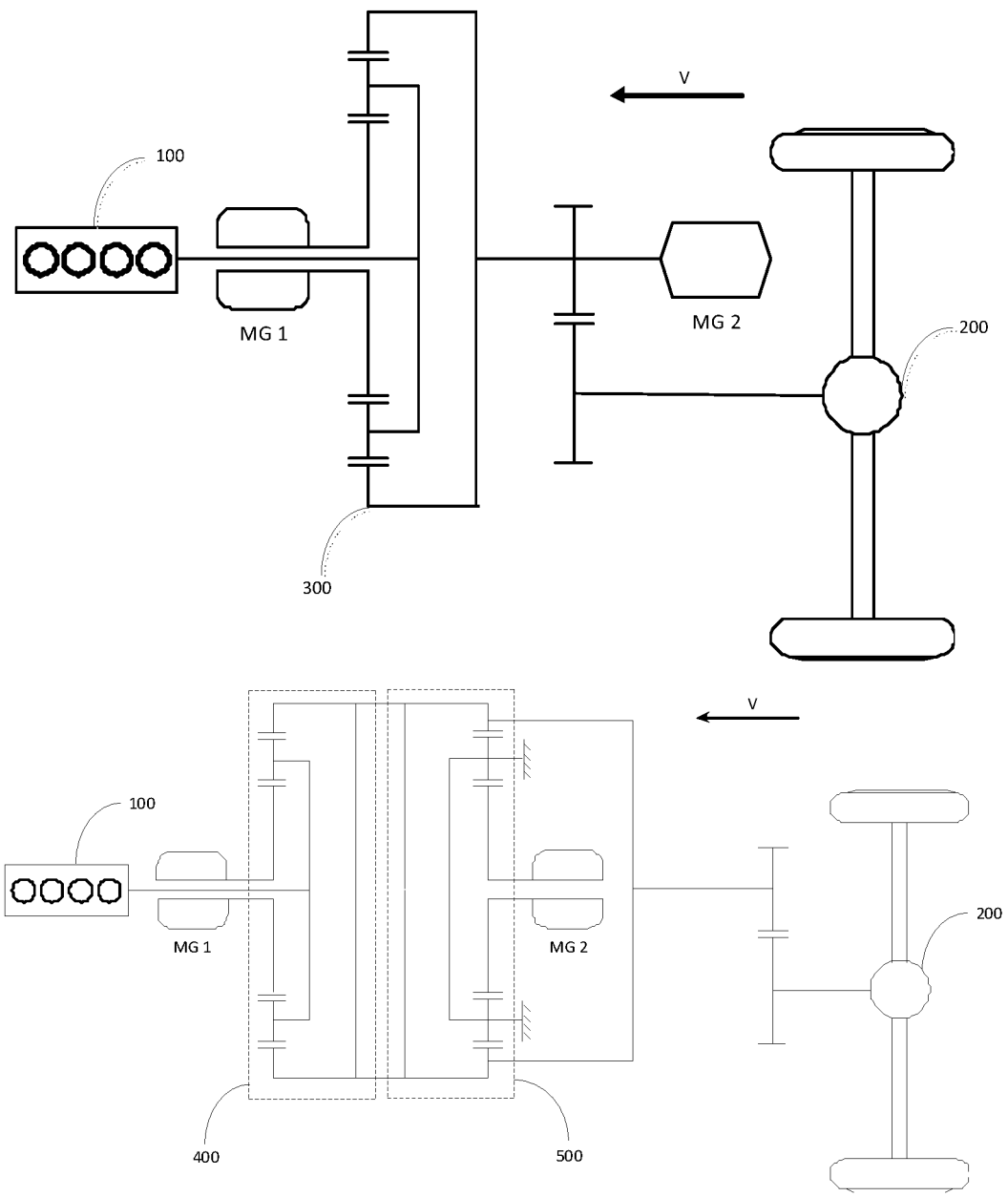
FIG. 1 is a schematic diagram of a mechanical structure of a power system according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein with reference to the accompanying drawings are explanatory, and are intended to explain the present disclosure, and are not construed to limit the present disclosure.

Before the method and the device for controlling a motion of a vehicle and a vehicle according to embodiments of the present disclosure are described, the structure of the power system of the electric vehicle is described first.

FIG. 1 is a schematic diagram of a mechanical structure of a power system according to an embodiment of the present disclosure. As illustrated in FIG. 1, the power system of the electric vehicle includes an engine 100, a first motor MG1, a second motor MG2, a power divider and a speed reducer 200. The power divider may be a single power divider 300, or the power divider may include a first power divider 400 and a second power divider 500. The functions and structures of the engine 100, the first motor MG1, the second motor MG2, and the power divider are known in the related art, and details are not described herein again.

The structure of the power system of the electric vehicle may include a single-row planetary gear train and a double-row planetary gear train. In the following, the present disclosure will be described by taking the single-row planetary gear train as an example, and double-row planetary gear train may also be applicable.

In the following, the method and the device for controlling a motion of a vehicle and a vehicle according to embodiments of the present disclosure will be described with reference to the accompanying drawings. The method for controlling the motion of a vehicle according to embodiments of the present disclosure will be described first with reference to the accompanying drawings.

Figure 2:
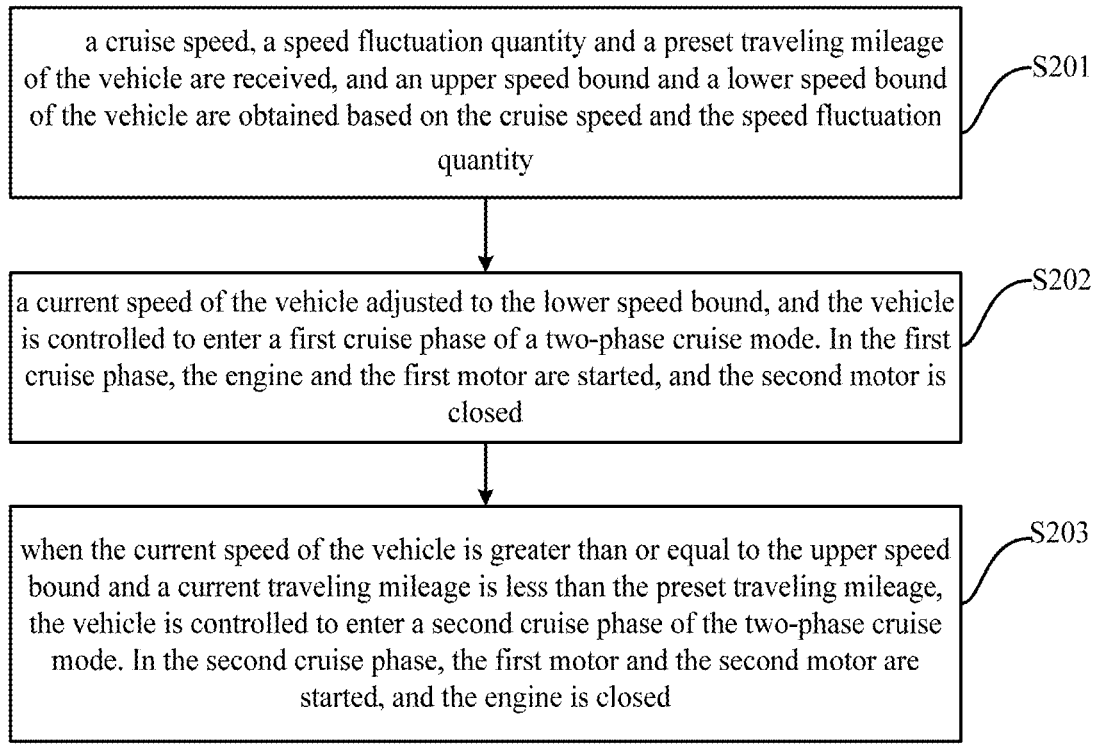
FIG. 2 is a flow chart of a method for controlling a motion of a vehicle according to an embodiment of the present disclosure.

FIG. 2 is a flow chart of a method for controlling a motion of a vehicle according to an embodiment of the present disclosure. As illustrated in FIG. 2, the method may include the following operations.

At block S201, a cruise speed, a speed fluctuation quantity and a preset traveling mileage of the vehicle are received, and an upper speed bound and a lower speed bound of the vehicle are obtained based on the cruise speed and the speed fluctuation quantity.

Figure 3:
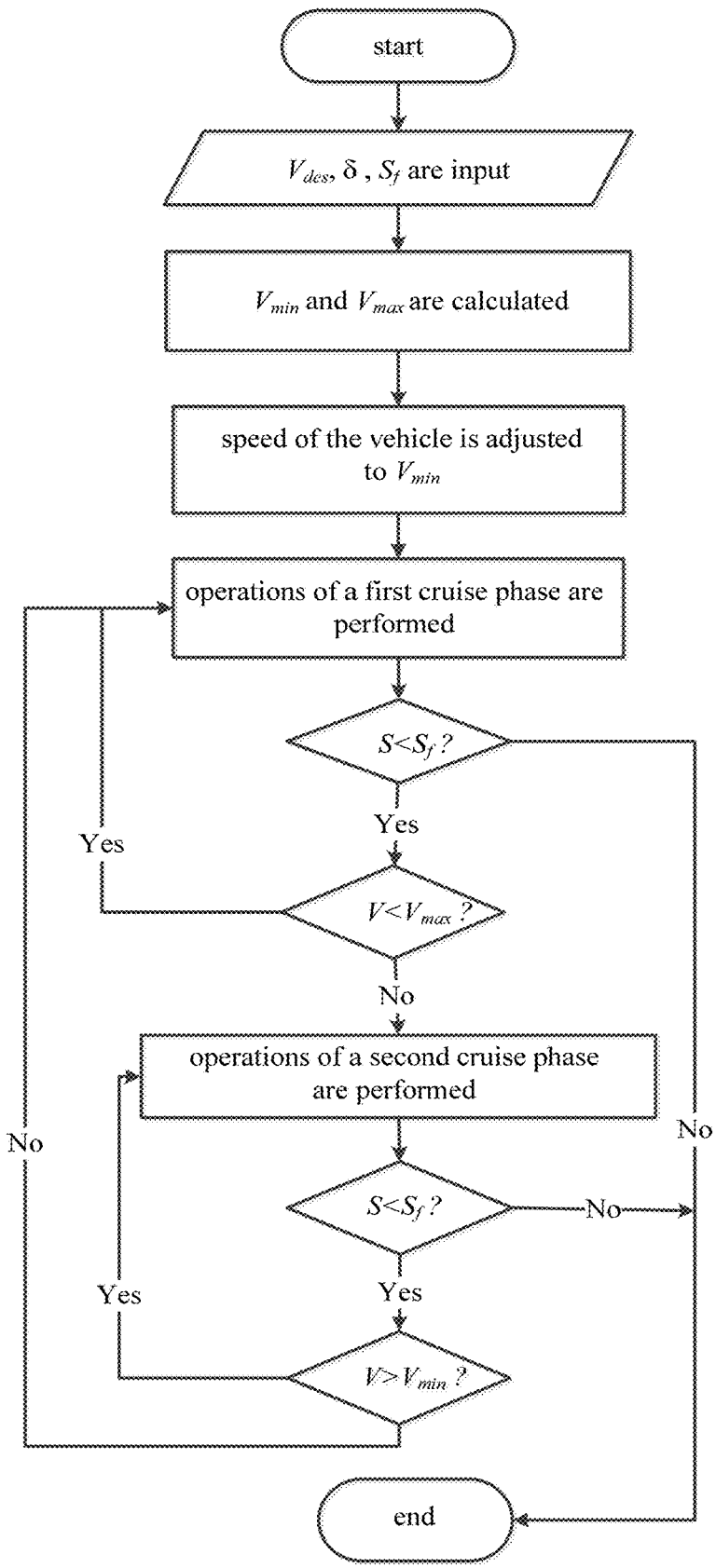
FIG. 3 is a flow chart of a method for controlling a motion of a vehicle according to another embodiment of the present disclosure.

It should be understood that, as illustrated in FIG. 3, the driver may inputs the cruise speed $V_{des}$, the speed fluctuation quantity δ, and the preset traveling mileage $S_f$ first, and an Electronic Control Unit (ECU) may calculate the upper speed bound $V_{max}$ and the lower speed bound $V_{min}$ of the vehicle by the following Formula (1) and Formula (2).

$$V_{max}=V_{des} \cdot (1+\delta) \quad (1)$$

$$V_{min}=V_{des} \cdot (1-\delta) \quad (2)$$

At block S202, a current speed of the vehicle adjusted to the lower speed bound, and the vehicle is controlled to enter a first cruise phase of a two-phase cruise mode. In the first cruise phase, the engine and the first motor are started, and the second motor is closed.

In an embodiment, in the first cruise phase, an output torque of the engine is adjusted to an optimal efficiency region, and a rotation speed and a torque of the first motor are adjusted to keep a rotation speed of the engine in the optimal efficiency region, so as to accelerate the vehicle. It is determined whether the current traveling mileage is less than the preset traveling mileage, and when the current traveling mileage is less than the preset traveling mileage, the output torque of the engine and the rotation speed and the torque of the first motor are continued to be adjusted, and it is determined whether the current speed of the vehicle is less than the upper speed bound of the vehicle. When the current speed of the vehicle is less than the upper speed bound of the vehicle, the output torque of the engine and the rotation speed and the torque of the first motor are continued to be adjusted.

In at least one embodiment of the present disclosure, the optimal efficiency region of the engine is obtained based on an optimal efficiency operating point of the engine. For example, in an embodiment, when the optimal efficiency operating point of the engine is $(T^*_{eng}, \omega^*_{eng})$, the optimal efficiency region of the engine may be defined as $(T^*_{eng} \cdot (1\pm 50\%), \omega^*_{eng}(1\pm 50\%))$.

FIG. 3 is a flow chart of a method for controlling a motion of a vehicle according to another embodiment of the present disclosure. As illustrated in FIG. 3, when the signal sent by the ECU to the engine is received, the periodic two-phase cruise mode may be performed. The cruise speed $V_{des}$, the speed fluctuation quantity δ, and the preset traveling mileage $S_f$ are input first, and the upper speed bound $V_{max}$ and the lower speed bound $V_{min}$ of the vehicle are calculated based on the cruise speed $V_{des}$ and the speed fluctuation quantity δ. The speed of the vehicle is adjusted to an initial speed of the first cruise mode (i.e., the lower speed bound $V_{min}$), and the vehicle is controlled to enter the first cruise phase of the two-phase cruise mode. In the first cruise phase, the engine and the first motor are started, the second motor is closed, and specific adjustment steps may include the followings.

At step 1, the output torque $T_{eng}$ of the engine is adjusted to an optimal efficiency region, and the rotation speed $\omega_{MG1}$ and the torque $T_{MG1}$ of the first motor are adjusted, such that the rotation speed $\omega_{eng}$ of the engine is also in the optimal efficiency region.

The output torque $T_{eng}$ of the engine can be greater than a resistance torque, such that the vehicle can be accelerated.

At step 2, it is determined whether the current traveling mileage S is less than the preset traveling mileage $S_f$, if $S<S_f$, step 1 is continued, and otherwise the vehicle is controlled to exit the two-phase cruise mode.

At step 3, it is determined whether the current speed V of the vehicle is less than the upper speed bound $V_{max}$ of the vehicle, if $V<V_{max}$, step 1 is continued, and otherwise the vehicle is controlled to enter the second cruise phase.

At block S203, when the current speed of the vehicle is greater than or equal to the upper speed bound and a current traveling mileage is less than the preset traveling mileage, the vehicle is controlled to enter a second cruise phase of the two-phase cruise mode. In the second cruise phase, the first motor and the second motor are started, and the engine is closed.

In an embodiment, in the second cruise phase, a rotation speed and a torque of the first motor are adjusted to keep the rotation speed of the engine in the optimal efficiency region, and the second motor provides the drive torque less than the resistance torque of the vehicle. It is determined whether the current traveling mileage is less than the preset traveling mileage, when the current traveling mileage is less than the preset traveling mileage, the rotation speed and the torque of the first motor are continued to be adjusted, and the second motor provides the drive torque less than the resistance torque of the vehicle, and it is determined whether the current speed of the vehicle is greater than the lower speed bound of the vehicle. When the current speed of the vehicle is greater than the lower speed bound of the vehicle, the rotation speed and the torque of the first motor are continued to be adjusted, and the second motor provides the drive torque less than the resistance torque of the vehicle. When the current speed of the vehicle is less than or equal to the lower speed bound of the vehicle, the vehicle is controlled to enter the first cruise phase.

In an embodiment, as illustrated in FIG. 3, in the second cruise phase, specific adjustment steps may include the followings.

At step a, the rotation speed $\omega_{MG1}$ and the torque $T_{MG1}$ of the first motor are adjusted to keep the rotation speed of the engine in the optimal efficiency region, and the second motor provides the drive torque $T_{MG2}$.

The drive torque $T_{MG2}$ can be less than the resistance torque, such that the vehicle can be decelerated without braking.

At step b, it is determined whether the current traveling mileage S is less than the preset traveling mileage $S_f$, if $S<S_f$, step a is continued, otherwise the vehicle is controlled to exit the two-phase cruise mode.

At step c, it is determined whether the current speed V of the vehicle is greater than the lower speed bound $V_{min}$ of the vehicle, if $V>V_{min}$, step a is continued, otherwise the vehicle is controlled to enter the first cruise phase.

In an implementation, a simulation is given, and the main parameters of the vehicle used in the simulation are illustrated in Table 1.

improve fuel economy by at least 10.41%, and economy of the vehicle can be effectively improved.

With the method for controlling the motion of a vehicle according to embodiments of the present disclosure, the vehicle can be controlled to enter the first cruise phase based on the lower speed bound of the vehicle, and when the current speed of the vehicle is greater than or equal to the upper speed bound of the vehicle, the vehicle is controlled to enter the second cruise phase, such that the cruise speed of the vehicle can be intelligently planned based on the upper speed bound and the lower speed bound, the power between the engine and/or multiple motors of the vehicle can be rationally distributed, economy and intelligence of the vehicle can be improved, and the reliability and practicability of the vehicle can also be improved.

Figure 6:
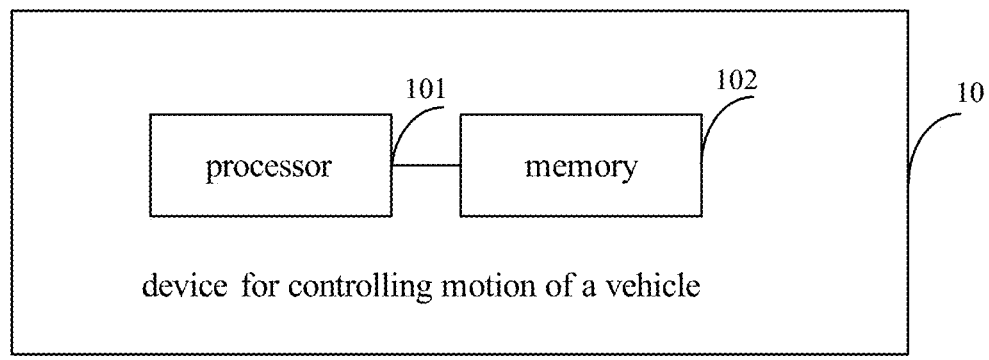
FIG. 6 is a block diagram of a device for controlling a motion of a vehicle according to an embodiment of the present disclosure.

FIG. 6 is a block diagram of a device for controlling a motion of a vehicle according to an embodiment of the present disclosure. As illustrated in FIG. 6, the device 10 includes a processor 101 and a memory 102 configured to store instructions executable by the processor.

The processor is configured to run a computer program corresponding to the instructions by calling the instructions stored in the memory, so as to: receive a cruise speed, a

TABLE 1

| parameter | numerical value | parameter | numerical value |
|---|---|---|---|
| vehicle weight m | 1600 kg | maximum torque of the engine $T_{eng\_max}$ | 150 Nm |
| aerodynamic drag coefficient $C_D$ | 0.30 | the maximum rotation speed of the engine $\omega_{eng\_max}$ | 5200 rpm |
| windward area $A_f$ | 2.30 m² | maximum torque of motor $T_{MG\_max}$ | ±100 Nm (MG1)/ 200 Nm (MG2) |
| air density $\rho_{air}$ | 1.205 kg/m³ | maximum rotation speed of motor $\omega_{MG\_max}$ | ±12000 rpm(MG1)/6000 rpm (MG2) |
| wheel radius $R_w$ | 0.301 m | moment of inertia of sun gear $I_s$ | 0.0015 kg/m² |
| rolling resistance coefficient f | 0.015 | moment of inertia of bracket $I_c$ | 0.008 kg/m² |
| gravitational constant g | 9.8 m/s² | moment of inertia of gear ring $I_r$ | 0.01 kg/m² |
| final drive ratio K | 4.113 | moment of inertia of engine crankshaft $I_{eng}$ | 0.26 kg/m² |
| battery capacity $Q_{batt\_max}$ | 1.35 kw · h | moment of inertia of MG1 rotor $I_{MG1}$ | 0.04 kg/m² |
| battery internal resistance $R_{int}$ | 1.8 Ω | moment of inertia of MG2 rotor $I_{MG2}$ | 0.0226 kg/m² |
| battery open-circuit-voltage $V_{OC}$ | 270 V | radius of gear ring R | 0.1 m |
| initial state of charge $SOC_0$ | 0.5 | radius of sun gear S | 0.26 m |
| optimal engine torque $T^*_{eng}$ | 100 Nm | the optimal rotation speed of the engine $\omega^*_{eng}$ | 2000 rpm |

Figure 4:
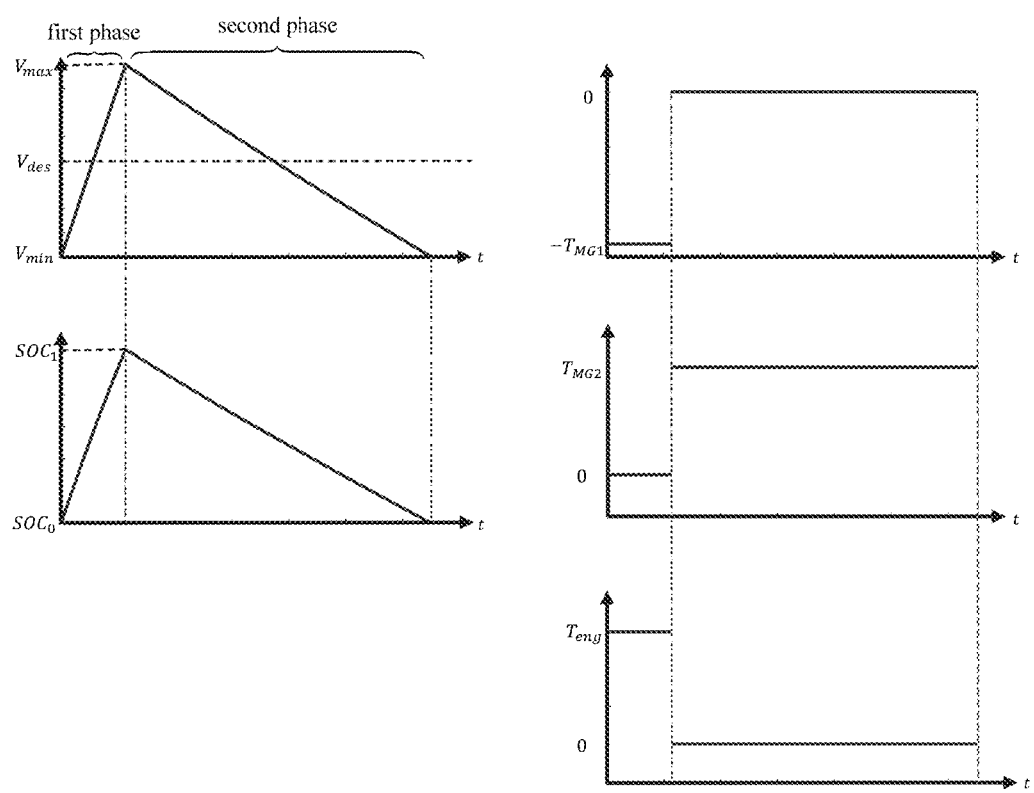
FIG. 4 is a schematic diagram of an energy-saving cruise strategy according to an embodiment of the present disclosure.
Figure 5:
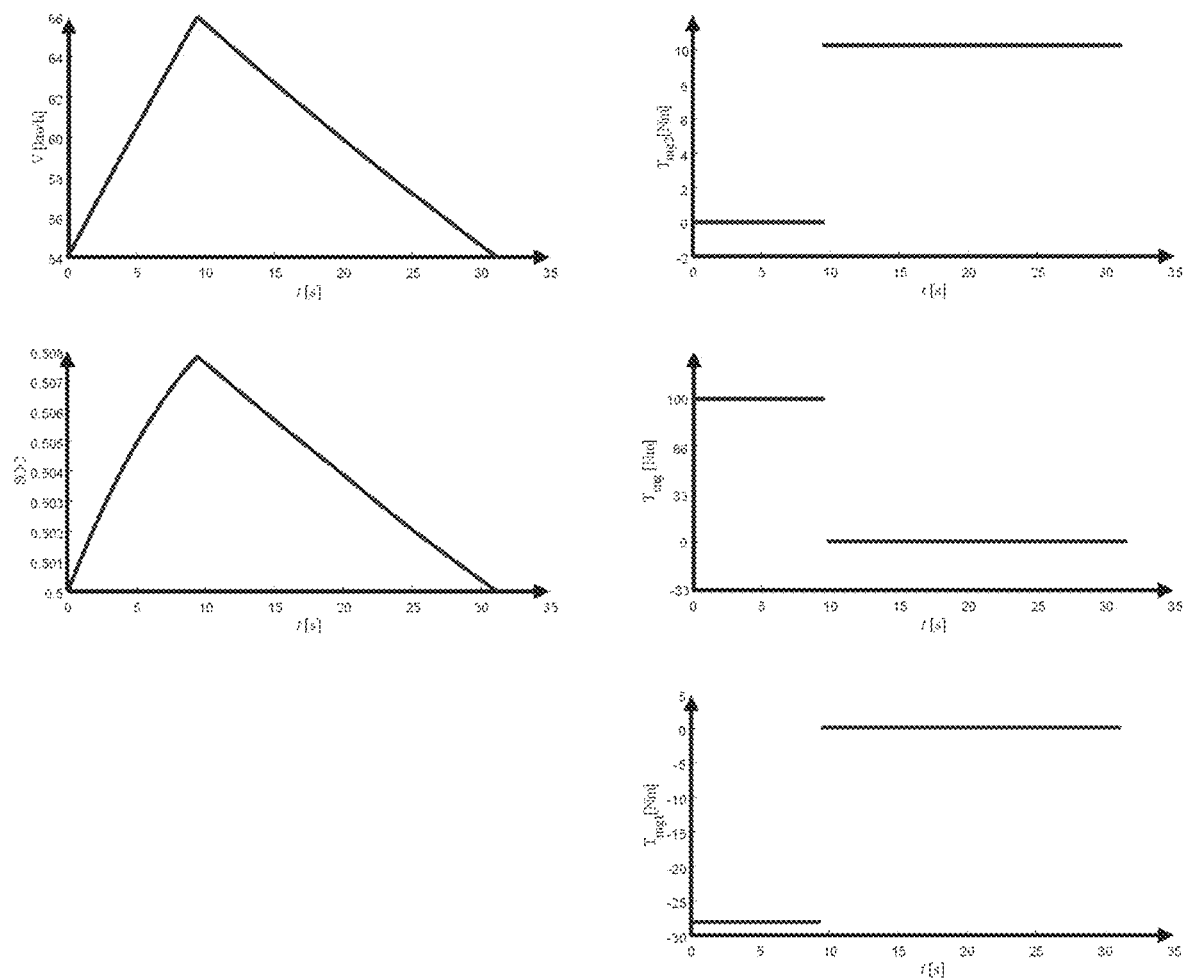
FIG. 5 is a schematic diagram of a vehicle state and a control variable according to an embodiment of the present disclosure.

The upper speed bound and the lower speed bound of the vehicle may be determined based on the cruise speed and the speed fluctuation quantity. When $V_{des}=60$ km/h, $\delta=10\%$, it can be calculated that $V_{max}=66$ km/h, and $V_{min}=54$ km/h. FIG. 4 is a schematic diagram of an energy-saving cruise strategy according to an embodiment of the present disclosure. FIG. 5 is a schematic diagram of a vehicle state and a control variable according to an embodiment of the present disclosure. When the speed of the vehicle is 60 km/h, the fuel consumption of per hundred kilometers is 3.12 liters/100 km, and in the same cruise speed, the fuel consumption of per hundred kilometers depends on the power distribution strategy, and in constant cruise, the fuel consumption per hundred kilometers is at least 3.48 liters/100 km. Under the speed, the method according to the present disclosure can speed fluctuation quantity and a preset traveling mileage of the vehicle, and obtain an upper speed bound and a lower speed bound of the vehicle based on the cruise speed and the speed fluctuation quantity; adjust a current speed of the vehicle to the lower speed bound, and control the vehicle to enter a first cruise phase of a two-phase cruise mode, in which in the first cruise phase, the engine and the first motor are started, and the second motor is closed; and control the vehicle to enter a second cruise phase of the two-phase cruise mode when the current speed of the vehicle is greater than or equal to the upper speed bound and a current traveling mileage is less than the preset traveling mileage, in which in the second cruise phase, the first motor and the second motor are started, and the engine is closed.

In an embodiment, in the first cruise phase, the processor is configured to: adjust an output torque of the engine to an optimal efficiency region, and adjust a rotation speed and a torque of the first motor to keep a rotation speed of the engine in the optimal efficiency region, to accelerate the vehicle; determine whether the current traveling mileage is less than the preset traveling mileage; when the current traveling mileage is less than the preset traveling mileage, continue to adjust the output torque of the engine and the rotation speed and the torque of the first motor, and determine whether the current speed of the vehicle is less than the upper speed bound of the vehicle; and when the current speed of the vehicle is less than the upper speed bound of the vehicle, continue to adjust the output torque of the engine and the rotation speed and the torque of the first motor.

In an embodiment, in the second cruise phase, the processor is configured to: adjust a rotation speed and a torque of the first motor to keep a rotation speed of the engine in an optimal efficiency region, and provide a drive torque less than a resistance torque of the vehicle by the second motor; determine whether the current traveling mileage is less than the preset traveling mileage; when the current traveling mileage is less than the preset traveling mileage, continue to adjust the rotation speed and the torque of the first motor and provide the drive torque less than the resistance torque of the vehicle by the second motor, and determine whether the current speed of the vehicle is greater than the lower speed bound of the vehicle; when the current speed of the vehicle is greater than the lower speed bound of the vehicle, continue to adjust the rotation speed and the torque of the first motor and provide the drive torque less than the resistance torque of the vehicle by the second motor; and when the current speed of the vehicle is less than or equal to the lower speed bound of the vehicle, control the vehicle to enter the first cruise phase.

In an embodiment, the optimal efficiency region of the engine is obtained based on an optimal efficiency operating point of the engine.

In an embodiment, the processor is further configured to control the vehicle to exit the two-phase cruise mode when the current traveling mileage is greater than or equal to the preset traveling mileage.

In an embodiment, the vehicle is the electric vehicle.

With the device 10 for controlling the motion of a vehicle according to embodiments of the present disclosure, the vehicle can be controlled to enter the first cruise phase based on the lower speed bound of the vehicle, and when the current speed of the vehicle is greater than or equal to the upper speed bound of the vehicle, the vehicle is controlled to enter the second cruise phase, such that the cruise speed of the vehicle can be intelligently planned based on the upper speed bound and the lower speed bound, the power between the engine and/or multiple motors of the vehicle can be rationally distributed, economy and intelligence of the vehicle can be improved, and the reliability and practicability of the vehicle can also be improved.

Embodiments of the present disclosure further provide a vehicle. The vehicle includes a power system including an engine, a first motor, and a second motor and a controller. The controller is configured to: receive a cruise speed, a speed fluctuation quantity and a preset traveling mileage of the vehicle, and obtain an upper speed bound and a lower speed bound of the vehicle based on the cruise speed and the speed fluctuation quantity; adjust a current speed of the vehicle to the lower speed bound, and control the vehicle to enter a first cruise phase of a two-phase cruise mode, in which in the first cruise phase, the engine and the first motor are started, and the second motor is closed; and control the vehicle to enter a second cruise phase of the two-phase cruise mode when the current speed of the vehicle is greater than or equal to the upper speed bound and a current traveling mileage is less than the preset traveling mileage, in which in the second cruise phase, the first motor and the second motor are started, and the engine is closed.

In an embodiment, in the first cruise phase, the controller is configured to: adjust an output torque of the engine to an optimal efficiency region, and adjust a rotation speed and a torque of the first motor to keep a rotation speed of the engine in the optimal efficiency region, to accelerate the vehicle; determine whether the current traveling mileage is less than the preset traveling mileage;

when the current traveling mileage is less than the preset traveling mileage, continue to adjust the output torque of the engine and the rotation speed and the torque of the first motor, and determine whether the current speed of the vehicle is less than the upper speed bound of the vehicle; and when the current speed of the vehicle is less than the upper speed bound of the vehicle, continue to adjust the output torque of the engine and the rotation speed and the torque of the first motor.

In an embodiment, in the second cruise phase, the controller is configured to: adjust a rotation speed and a torque of the first motor to keep a rotation speed of the engine in an optimal efficiency region, and control the second motor to provide a drive torque less than a resistance torque of the vehicle; determine whether the current traveling mileage is less than the preset traveling mileage; when the current traveling mileage is less than the preset traveling mileage, continue to adjust the rotation speed and the torque of the first motor and control the second motor to provide the drive torque less than the resistance torque of the vehicle, and determine whether the current speed of the vehicle is greater than the lower speed bound of the vehicle; when the current speed of the vehicle is greater than the lower speed bound of the vehicle, continue to adjust the rotation speed and the torque of the first motor and control the second motor to provide the drive torque less than the resistance torque of the vehicle; and when the current speed of the vehicle is less than or equal to the lower speed bound of the vehicle, control the vehicle to enter the first cruise phase.

In an embodiment, the optimal efficiency region of the engine is obtained based on an optimal efficiency operating point of the engine.

In an embodiment, the controller is further configured to control the vehicle to exit the two-phase cruise mode when the current traveling mileage is greater than or equal to the preset traveling mileage.

In an embodiment, the vehicle is an electric vehicle.

In descriptions of the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. In the present specification, the appearances of the above terms are not necessarily referring to the same embodiment or example of the present disclosure. Furthermore, the particular features, structures, materials, or characteristics may be combined in any suitable manner in one or more embodiments or examples. In addition, under non-contradictory circumstances, various embodiments or examples, as well as features of various embodiments or examples described in the present specification can be combined by those skilled in the art.

Any process or method described in a flow chart or other means may be understood as one or more modules, segments or portions including one or more executable instruction codes of the procedures configured to achieve a certain logic function or process, and the preferred embodiments of the present disclosure include other performances, in which the performance may be achieved in other orders instead of the order illustrated or discussed, such as in an almost simultaneous way or in an opposite order, which should be appreciated by those skilled in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such as a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer-readable medium includes specific examples (a non-exhaustive list): the connecting portion (electronic device) having one or more arrangements of wire, the portable computer disc cartridge (a magnetic device), the random access memory (RAM), the read-only memory (ROM), the electrically programmable read only memory (EPROM or the flash memory), the optical fiber device and the compact disk read-only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It can be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer-readable storage medium, and the program includes one step or combinations of the steps of the method when the program is executed.

In addition, each functional unit in the present disclosure may be integrated into one progressing module, or each functional unit exists as an independent unit, or two or more functional units may be integrated into one module. The integrated module can be embodied in hardware or software. If the integrated module is embodied in software and sold or used as an independent product, it can be stored in the computer-readable storage medium.

The computer-readable storage medium mentioned above may be read-only memories, magnetic disks, or optical disks. Although explanatory embodiments have been illustrated and described, it would be appreciated by those skilled in the art that the above embodiments cannot be construed to limit the present disclosure, and changes, alternatives, and modifications may be made in the embodiments without departing from spirit, principles, and scope of the present disclosure.

What is claimed is:

1. A method for controlling a motion of a vehicle, a power system of the vehicle comprising an engine, a first motor, and a second motor, the method comprising:

receiving a cruise speed, a speed fluctuation quantity and a preset traveling mileage of the vehicle, and obtaining an upper speed bound and a lower speed bound of the vehicle based on the cruise speed and the speed fluctuation quantity;

adjusting a current speed of the vehicle to the lower speed bound, and controlling the vehicle to enter a first cruise phase of a two-phase cruise mode, wherein in the first cruise phase, the engine and the first motor are started, and the second motor is off; and controlling the vehicle to enter a second cruise phase of the two-phase cruise mode when the current speed of the vehicle is greater than or equal to the upper speed bound and a current traveling mileage is less than the preset traveling mileage, wherein in the second cruise phase, the first motor and the second motor are started, and the engine is off;

wherein in the first cruise phase, the method comprises:

adjusting an output torque of the engine to an optimal efficiency region, and adjusting a rotation speed and a torque of the first motor to keep a rotation speed of the engine in the optimal efficiency region, to accelerate the vehicle, wherein the optimal efficiency region is obtained based on an optimal efficiency operating point ($T^*_{eng}$, $\omega^*_{eng}$) of the engine and expressed as ($T'_{eng} \cdot (1 \pm 50\%)$, $\omega^*_{eng}(1 \pm 50\%)$);

determining whether the current traveling mileage is less than the preset traveling mileage;

when the current traveling mileage is less than the preset traveling mileage, continuing to adjust the output torque of the engine and the rotation speed and the torque of the first motor, and determining whether the current speed of the vehicle is less than the upper speed bound of the vehicle; and when the current speed of the vehicle is less than the upper speed bound of the vehicle, continuing to adjust the output torque of the engine and the rotation speed and the torque of the first motor, and when the current speed of the vehicle is greater than or equal to the upper speed bound of the vehicle, controlling the vehicle to enter the second cruise phase.

2. The method according to claim 1, wherein in the second cruise phase, the method comprises:

adjusting a rotation speed and a torque of the first motor to keep a rotation speed of the engine in an optimal efficiency region, and providing a drive torque less than a resistance torque of the vehicle by the second motor;

determining whether the current traveling mileage is less than the preset traveling mileage;

when the current traveling mileage is less than the preset traveling mileage, continuing to adjust the rotation speed and the torque of the first motor and providing the drive torque less than the resistance torque of the vehicle by the second motor, and determining whether the current speed of the vehicle is greater than the lower speed bound of the vehicle;

when the current speed of the vehicle is greater than the lower speed bound of the vehicle, continuing to adjust the rotation speed and the torque of the first motor and providing the drive torque less than the resistance torque of the vehicle by the second motor; and when the current speed of the vehicle is less than or equal to the lower speed bound of the vehicle, controlling the vehicle to enter the first cruise phase.

3. The method according to claim 1, wherein the method further comprises:

when the current traveling mileage is greater than or equal to the preset traveling mileage, controlling the vehicle to exit the two-phase cruise mode.

4. The method according to claim 1, wherein the vehicle comprises an electric vehicle.

5. A device for controlling a motion of a vehicle, a power system of the vehicle comprising an engine, a first motor, and a second motor, the device comprising:
a processor; and
a memory configured to store instructions executable by the processor;
wherein the processor is configured to run a computer program corresponding to the instructions by calling the instructions stored in the memory, to:
receive a cruise speed, a speed fluctuation quantity and a preset traveling mileage of the vehicle, and obtain an upper speed bound and a lower speed bound of the vehicle based on the cruise speed and the speed fluctuation quantity;
adjust a current speed of the vehicle to the lower speed bound, and control the vehicle to enter a first cruise phase of a two-phase cruise mode, wherein in the first cruise phase, the engine and the first motor are started, and the second motor is off; and
control the vehicle to enter a second cruise phase of the two-phase cruise mode when the current speed of the vehicle is greater than or equal to the upper speed bound and a current traveling mileage is less than the preset traveling mileage, wherein in the second cruise phase, the first motor and the second motor are started, and the engine is off;
wherein in the first cruise phase, the processor is configured to:
adjust an output torque of the engine to an optimal efficiency region, and adjust a rotation speed and a torque of the first motor to keep a rotation speed of the engine in the optimal efficiency region, to accelerate the vehicle, wherein the optimal efficiency region is obtained based on an optimal efficiency operating point $(T^*_{eng}, \omega^*_{eng})$ of the engine and expressed as $(T^*_{eng} \cdot (1\pm 50\%), \omega^*_{eng}(1\pm 50\%))$;
determine whether the current traveling mileage is less than the preset traveling mileage;
when the current traveling mileage is less than the preset traveling mileage, continue to adjust the output torque of the engine and the rotation speed and the torque of the first motor, and determine whether the current speed of the vehicle is less than the upper speed bound of the vehicle; and when the current speed of the vehicle is less than the upper speed bound of the vehicle, continue to adjust the output torque of the engine and the rotation speed and the torque of the first motor, and when the current speed of the vehicle is greater than or equal to the upper speed bound of the vehicle, control the vehicle to enter the second cruise phase.

6. The device according to claim 5, wherein in the second cruise phase, the processor is configured to:
adjust a rotation speed and a torque of the first motor to keep a rotation speed of the engine in an optimal efficiency region, and provide a drive torque less than a resistance torque of the vehicle by the second motor;
determine whether the current traveling mileage is less than the preset traveling mileage;
when the current traveling mileage is less than the preset traveling mileage, continue to adjust the rotation speed and the torque of the first motor and provide the drive torque less than the resistance torque of the vehicle by the second motor, and determine whether the current speed of the vehicle is greater than the lower speed bound of the vehicle;
when the current speed of the vehicle is greater than the lower speed bound of the vehicle, continue to adjust the rotation speed and the torque of the first motor and provide the drive torque less than the resistance torque of the vehicle by the second motor; and
when the current speed of the vehicle is less than or equal to the lower speed bound of the vehicle, control the vehicle to enter the first cruise phase.

7. The device according to claim 5, wherein the processor is further configured to:
when the current traveling mileage is greater than or equal to the preset traveling mileage, control the vehicle to exit the two-phase cruise mode.

8. The device according to claim 5, wherein the vehicle comprises an electric vehicle.

9. A vehicle, comprising:
a power system comprising an engine, a first motor and a second motor; and
a controller, configured to:
receive a cruise speed, a speed fluctuation quantity and a preset traveling mileage of the vehicle, and obtain an upper speed bound and a lower speed bound of the vehicle based on the cruise speed and the speed fluctuation quantity;
adjust a current speed of the vehicle to the lower speed bound, and control the vehicle to enter a first cruise phase of a two-phase cruise mode, wherein in the first cruise phase, the engine and the first motor are started, and the second motor is off; and
control the vehicle to enter a second cruise phase of the two-phase cruise mode when the current speed of the vehicle is greater than or equal to the upper speed bound and a current traveling mileage is less than the preset traveling mileage, wherein in the second cruise phase, the first motor and the second motor are started, and the engine is off;
wherein in the first cruise phase, the controller is configured to:
adjust an output torque of the engine to an optimal efficiency region, and adjust a rotation speed and a torque of the first motor to keep a rotation speed of the engine in the optimal efficiency region, to accelerate the vehicle, wherein the optimal efficiency region is obtained based on an optimal efficiency operating point $(T^*_{eng}, \omega^*_{eng})$ of the engine and expressed as $(T'_{eng} \cdot (1 \pm 50\%), \omega^*_{eng}(1 \pm 50\%))$;

determine whether the current traveling mileage is less than the preset traveling mileage;

when the current traveling mileage is less than the preset traveling mileage, continue to adjust the output torque of the engine and the rotation speed and the torque of the first motor, and determine whether the current speed of the vehicle is less than the upper speed bound of the vehicle; and when the current speed of the vehicle is less than the upper speed bound of the vehicle, continue to adjust the output torque of the engine and the rotation speed and the torque of the first motor, and when the current speed of the vehicle is greater than or equal to the upper speed bound of the vehicle, control the vehicle to enter the second cruise phase.

10. The vehicle according to claim 9, wherein in the second cruise phase, the controller is configured to:

adjust a rotation speed and a torque of the first motor to keep a rotation speed of the engine in an optimal efficiency region, and control the second motor to provide a drive torque less than a resistance torque of the vehicle;

determine whether the current traveling mileage is less than the preset traveling mileage;

when the current traveling mileage is less than the preset traveling mileage, continue to adjust the rotation speed and the torque of the first motor and control the second motor to provide the drive torque less than the resistance torque of the vehicle, and determine whether the current speed of the vehicle is greater than the lower speed bound of the vehicle;

when the current speed of the vehicle is greater than the lower speed bound of the vehicle, continue to adjust the rotation speed and the torque of the first motor and control the second motor to provide the drive torque less than the resistance torque of the vehicle; and when the current speed of the vehicle is less than or equal to the lower speed bound of the vehicle, control the vehicle to enter the first cruise phase.

11. The vehicle according to claim 9, wherein the controller is further configured to:

when the current traveling mileage is greater than or equal to the preset traveling mileage, control the vehicle to exit the two-phase cruise mode.

12. The vehicle according to claim 9, wherein the vehicle comprises an electric vehicle.

* * * * *